United States Patent [19]

Sanders

[11] Patent Number: 4,464,288
[45] Date of Patent: Aug. 7, 1984

[54] EMULSIFIER SYSTEM

[76] Inventor: Herbert L. Sanders, 2020 Swainwood Dr., Glenview, Ill. 60022

[21] Appl. No.: 521,031

[22] Filed: Aug. 8, 1983

[51] Int. Cl.$^3$ ............... B01J 13/00; B01F 17/16; B01F 17/28
[52] U.S. Cl. .................. 252/312; 252/357; 106/10
[58] Field of Search .......... 252/312, 357, 8.55 D

[56] References Cited

U.S. PATENT DOCUMENTS

| | | | |
|---|---|---|---|
| 3,497,365 | 2/1970 | Atherton et al. | 252/390 |
| 3,585,051 | 6/1971 | Johnson | 252/390 |
| 3,658,718 | 4/1972 | Clumpner | 252/312 |
| 4,189,593 | 2/1980 | Wechsler et al. | 252/357 |
| 4,290,903 | 9/1981 | Macgilp et al. | 252/186.38 |

*Primary Examiner*—Richard D. Lovering
*Assistant Examiner*—Anne Brookes
*Attorney, Agent, or Firm*—Michael G. Berkman

[57] ABSTRACT

An emulsifier system for forming stable oil-in-water emulsions and constituting a blend of difatty imidazoline quaternaries containing a combination of shorter and longer chain-length fatty acid components as substituents.

6 Claims, No Drawings

EMULSIFIER SYSTEM

BACKGROUND OF THE INVENTION

This invention relates to new types of cationic quaternary ammonium emulsifier formulations for producing stable oil-in-water micro-emulsions. More particularly, the invention is directed to aqueous emulsions for depositing ("exhausting") or distributing hydrophobic films onto pre-washed surfaces as a substantially continuous film.

The emulsion droplets of cationic systems of the type employed in the present invention carry positive electrical charges so that the emulsified oil tends to be attracted to surfaces such as paper, fabric, or painted metal, these surfaces being normally negatively charged when in contact with water. As a result, the oil is exhausted, or "plated" onto the surface, creating an oily, substantially continuous hydrophobic film.

The phenomenon described has applications in several areas. For example, it is often desired to coat mops, wiping rags or doormats with oil so that dust and dirt will adhere. This effect is easily achieved by emersing the articles in an emulsion containing positively charged oil particles. The oil leaves the aqueous phase and deposits onto the fibers of the article treated.

Another important commercial application of the principle described is to use the emulsion system as a "rinse aid" in the so-called "spray-waxing" of automobiles. The end effect sought is to form a continuous, hydrophobic, water-repellant film on the car surface after the main wash cycle has been completed. The water left on the surface in the final rinse is caused to dissociate to form beads that can be blown off with the aid of an air jet. The vehicle surface is left essentially dry and clean, obviating laborious hand-wiping. It is known in the art how to produce emulsions suitable for the specific automotive application described. The advantages of cationic emulsifiers have also been recognized, and various types have been proposed in the prior art. Among these are the following:

|   |   |   | U.S. Pat. No. |
|---|---|---|---|
| 1. | Fatty amine salts | Chestchowski | 3340063 |
|   |   | Holbus | 3518099 |
| 2. | Alkoxylated fatty amines | Clark | 3222213 |
| 3. | Monofatty imidazoline | Clark | 3222213 |
| 4. | Monofatty imidazoline salts | Johnson | 3583051 |
| 5. | Monofatty quaternary ammonium chloride | Clark | 3222213 |
| 6. | Difatty quaternary ammonium chloride | Atherton | 3497365 |
| 7. | Difatty alkoxylated amidoamine quats | Clumpner | 3658718 |

The preparation and the properties and comparative features of various emulsion systems, including systems broadly of the general class involved in the instant case, are described in U.S. Pat. No. 3,658,718, and the entire disclosure of that patent is specifically incorporated herein by reference, to the extent not inconsistent herewith.

Some prior art emulsifying systems produce milky, opaque emulsions of petroleum oils in water. These formulations have been found to lack desired stability. Clear, micro-emulsions which can be stored and diluted with no tendency to cream out are preferred. The exceedingly small "droplet" size in such emulsions also results in more uniform distribution of the oil film over the car surface, ensuring improved beading and more ready removal of the rinse water film.

In order to achieve such clear emulsions, prior researchers and formulators have resorted to the supplemental addition of alkoxylated (nonionic) compounds. Thus, Atherton U.S. Pat. No. 3,497,365 teaches the use of blends of difatty quaternaries and ethoxylated amines; Clark U.S. Pat. No. 3,222,213 recommends that the monofatty imidazolines be blended with ethoxylated tallow amines; and Clumper U.S. Pat. No. 3,658,718 incorporates ethylene oxide groups into the emulsifier molecule itself.

SUMMARY OF THE INVENTION

In accordance with the present invention, it has been discovered that highly effective cationic emulsifier systems for oils are produced by quaternizing difatty imidazolines made by reacting two different groups of selected fatty acids with alkylene polyamines. These compounds have been found to be much more effective than monofatty imidazoline types, particularly in forming clear, micro-emulsions. Furthermore, the difatty imidazoline quaternaries of the present invention do not require dilution with alkoxylated nonionic emulsifiers. Nor need alkoxy groups be incorporated into the structure in order to form acceptable emulsions. As a result, the unique non-alkoxylated quaternary emulsifiers of the present invention function to impart their full cationic charge to the dispersed oil droplets without undesirable dilution by the electrically inert nonionic component.

DETAILED DESCRIPTION OF PREFERRED EMBODIMENTS

Preferred embodiments of the present invention are emulsifier systems which constitute blends of two classes of quaternary compositions as characterized by the schematic representations set forth below:

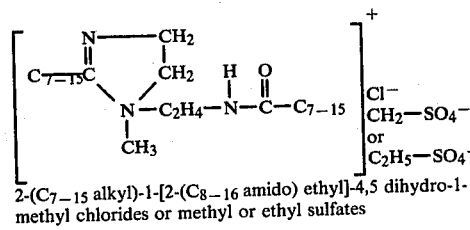

2-($C_{7-15}$ alkyl)-1-[2-($C_{8-16}$ amido) ethyl]-4,5 dihydro-1-methyl chlorides or methyl or ethyl sulfates

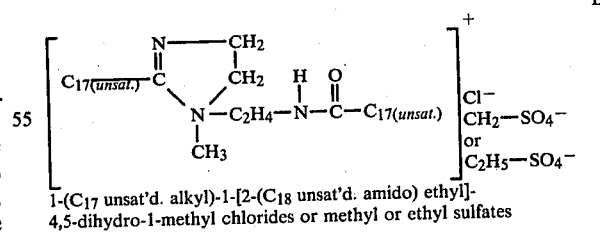

1-($C_{17}$ unsat'd. alkyl)-1-[2-($C_{18}$ unsat'd. amido) ethyl]-4,5-dihydro-1-methyl chlorides or methyl or ethyl sulfates In the compositions depicted above, the shorter fatty acid residue chains of Comp. A are such as derived from coconut oil and include fatty acid residues of chain length from 7 to 15. The longer, $C_{17}$ unsaturated fatty acid residues of Comp. B are oleic acid residues, linoleic acid residues, or residues derived from soya oil, safflower oil, cotton seed oil, tallow or other chemically related oil products containing long chain unsaturated fatty acids. The anion is, for example, chloride or methyl sulfate, or ethyl sulfate.

While the general laboratory techniques for producing compounds of the type utilized in the present invention are known and described in the literature, the following brief specific description is provided for purposes of convenient reference and is illustrative of the procedures by which the emulsifiers of the invention are conveniently prepared:

EXAMPLE 1

Into a 3-neck, 500 ml reaction flask equipped with a stirrer, nitrogen and vacuum inlets, and a condenser, etc., were added the following:

| Coconut oil fatty acid | 214 g. | (1.0 mole) |
|---|---|---|
| diethylene triamine | 51.5 g. | (0.5 mole) |
| xylene | 100 g. | |

The charged mixture was heated at 105 degrees C. for several hours until the amidification reaction was completed. The temperature was then carefully raised to above 140 degrees C. while distilling off xylene and water to form the difatty imidazole ring. Finally, the tertiary nitrogen was quaternized using methyl chloride (or dimethyl sulfate). The resulting product was that with "shorter" chain-length saturated fatty acid substituents.

EXAMPLE 2

The higher, unsaturated chain length component B of the formulation identified hereabove was prepared by a similar procedure but substituting oleic acid, or fatty acids derived from safflower oil or cottonseed oil, etc., for the coconut oil fatty acids.

EXAMPLE 3

In order to form the desired, stable emulsions of oil-in-water, component A and component B were blended to produce a mixed emulsifier system of the proper HLB (hydrophile-lipophile balance). For example, for an oil of high HLB (about 12) or polarity, a high proportion of the polar composition (component A) is required. Conversely, for an oil with low HLB, e.g. about 8, more of the hydrophobic composition (component B) is needed.

EXAMPLE 4

Using a paraffinic petroleum oil with a viscosity of 90 SUS (Saybolt Universal Seconds) at 100 degrees F., a blend of 30 percent of component A with 70 percent of component B was found to be highly satisfactory. When the resulting emulsifier system was dissolved in the oil and the solution poured into water, clear, stable emulsions were produced.

It will be understood that a more hydrophobic ratio of up to about 5 parts by weight of component A to about 95 parts by weight of component B may be desired depending on low polarity characteristics of a particular material to be exhausted.

EXAMPLE 5

On the other hand, emulsification of a more polar liquid such as ortho-dichloro benzene required an emulsifier of high HLB. A blend of 95 parts of the more polar component A to 5 parts of the less polar component B proved optimum.

EXAMPLE 6

In the light of the teachings of the present invention it will be understood that one can obtain a balanced blend of the shorter and the longer fatty acid chain imidazolinium compounds by reacting the diethylene triamine with a selected concentrational pre-blend of the corresponding fatty acids. Using this technique, the mixed emulsifier system is produced in a one step synthesis. However, in adopting this technique, one foregoes the flexibility inherent in being able to mix two separate components.

What is claimed is:

1. A cationic emulsifier system for producing stable oil-in-water micro-emulsions, said system comprising:
   blends of difatty imidazolinium quaternaries having the following structural formulae:

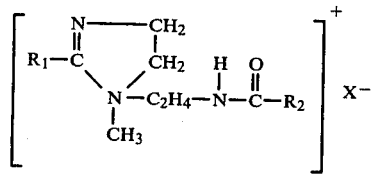

and

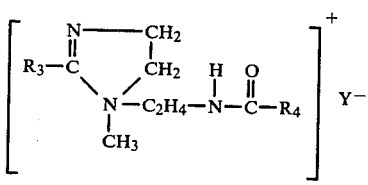

wherein each of $R_1$, $R_2$ is a saturated fatty acid residue of chain length 7 to 15 and $R_3$, $R_4$ are $C_{17}$ unsaturated fatty acid residues, and X and Y are water-soluble anions.

2. A cationic micro-emulsion of oil and water containing the emulsifier system of claim 1.

3. The emulsifier system of claim 1 wherein said water-soluble anion is selected from the group consisting of chloride, methyl sulfate, and ethyl sulfate.

4. The method of preparing stable cationic imidazolinium quaternary micro-emulsion systems having HLB ranges of between about 8 and about 12, said method comprising:
   reacting diethylene triamine with a source of C 7–15 chain saturated fatty acids selected from the group consisting of coconut oil fatty acids, palm kernel oil fatty acids, lauric acid and mixtures thereof to form a first difatty imidazole ring compound,
   treating said first imidazole ring compound with a quaternizing agent selected from the group consisting of methyl chloride, dimethyl sulfate, and diethyl sulfate to provide a first difatty acid imidazolinium quaternary,
   reacting diethylene triamine with a source of C 17 chain unsaturated fatty acids selected from the group consisting of oleic acid, linoleic acid, and unsaturated fatty acids derived from soya oil, safflower oil, and tallow, and mixtures thereof, to form a second difatty imidazole ring compound,
   treating said second imidazole ring compound with a quaternizing agent selected from the group consisting of methyl chloride, dimethyl sulfate, and diethyl sulfate to provide a second difatty acid imidazolinium guaternary, and blending said first imidazolinium quaternary and said second imidazolinium quaternary in a ratio of between 5 to 95 parts by weight to 95 to 5 parts by weight to provide an HLB between about 8 and about 12.

5. The method of preparing stable cationic quaternized imidazolinuim micro-emulsion systems having HLB values in the range of from about 8 to about 12 and characterized by enhanced oil-exhaustion capabilities, said method comprising the steps of:

reacting diethylene triamine with a blend of fatty acids, said blend comprising a mixture of saturated fatty acids and unsaturated fatty acids, said mixture being selected from the group consisting of coconut oil fatty acids, oleic acid, lineoleic acid, soya acids, and mixtures thereof to provide a mixture of difatty imidazolines, including imidazolines having fatty acid substituents including fatty acid residues of chain length C 7–15 and unsaturated fatty acid residues of chain length C-17, and treating said mixture of difatty imidazolines with a quaternizing agent selected from the group consisting of methyl chloride, dimethylsulfate, and diethyl sulfate to provide a quaternized imidazolinium emulsifying system having fatty acid substituents of chain length C 7–15 and of chain length C-17.

6. The method as set forth in claim 5 wherein said mixture of fatty acids contains about 5 to about 40 percent by weight of C 7–15 chain-length fatty acids and wherein the balance of said mixture of fatty acids constitutes C-17 chain-length fatty acids.

* * * * *